United States Patent Office 3,549,759
Patented Dec. 22, 1970

3,549,759
USE OF 2-(CHLORO OR TRICHLOROMETHYL)-4-AMINO-6-SUBSTITUTED - s - TRIAZINES FOR INDUCING DEPRESSANT EFFECTS IN ANIMALS
Jiro K. Kodama and James R. Albert, Modesto, Calif., assignors to Shell Oil Company, New York, N.Y., a corporation of Delaware
No Drawing. Continuation-in-part of abandoned applications Ser. No. 498,116, and Ser. No. 498,118, Oct. 19, 1965. This application Mar. 27, 1968, Ser. No. 716,352
Int. Cl. A61k 27/00
U.S. Cl. 424—249
12 Claims

ABSTRACT OF THE DISCLOSURE

Use of 2 - (chloro or trichloromethyl) - 4 - amino - 6-substituted-s-triazines for inducing depressant effects in animals.

This application is a continuation-in-part of copending applications Ser. Nos. 498,116 and 498,118, both filed October 19, 1965 and both now abandoned.

BACKGROUND OF THE INVENTION

This invention relates to a method of inducing depressant effects in animals using certain s-triazines. More particularly it relates to the use of certain s-triazines as analgesics, muscle relaxants, anticonvulsants and tranquilizers and to pharmaceutical and veterinary compositions containing such triazines.

A considerable number of naturally occurringg alkaloids and synthetic chemicals are available as useful analgesics, anticonvulsants and muscle relaxants. Repeated administration of many such analgesics creates the potential danger of drug addiction. The need for effective analgesics which minimize the hazards of drug addiction has long been recognized.

SUMMARY OF THE INVENTION

It is an object of the present invention to provide a novel method for inducing depressant effects in mammals. These depressant effects include sedative, analgesic, muscle relaxant, anticonvulsant and tranquilizing effects. Another object of the invention is to provide a novel method of pain control with minimum hazard of drug addiction. Yet another object is to provide a novel method for inducing depressant effects in mammals with certain 2-(chloro or trichloromethyl) - 4 - amino - 6 - substituted - s - triazines. The provisions for supplying the art with novel pharmaceutical and veterinary compositions capable of inducing neurological depressant effects in mammals forms another object.

These and other objects are accomplished by administering to a mammal an effective dosage of a 2-(chloro or trichloromethyl) - 4 - amino - 6 - substituted - s - triazine of the formula

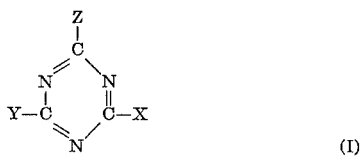

(I)

wherein
X is —Cl or —CCl$_3$;
Y is —NRR$_1$ in which
R is hydrogen, alkyl of 1–3 carbon atoms or hydroxyalkyl of 1–4 carbon atoms,
R$_1$ is alkyl of 1–4 carbon atoms, hydroxyalkyl of 1–4 carbon atoms, chloroalkyl of 1–3 carbon atoms or methoxyalkyl of 2–5 carbon atoms and
R and R$_1$ together with the nitrogen may represent piperidino; and Z is

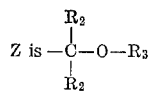

in which
R$_2$ is alkyl of 1–3 carbon atoms and
R$_3$ is hydrogen or alkoxycarbonyl of up to 4 carbon atoms;

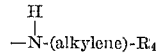

in which
R$_4$ is dialkylaminocarbonyl of up to 7 carbon atoms or alkylsulfinyl of 1–3 carbon atoms and alkylene is of 1–3 carbon atoms;

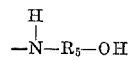

in which
R$_5$ is alkylene of 1–4 carbon atoms;

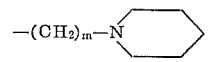

in which $m$ is 2–4;
—CCl$_3$;
—O—alkyl in which alkyl is of 1–3 carbon atoms;

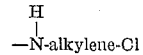

in which alkylene is of 1–3 carbon atoms;

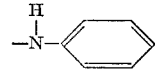

or

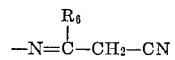

in which R$_6$ is alkyl of 1–3 carbon atoms.

Representative species of the above s-triazines are:

(1) 2-trichloromethyl-4-ethylamino-6-(1-hydroxy-1-methylethyl)-s-triazine
(2) 2-trichloromethyl-4-(2-hydroxyethylamino)-6-(1-hydroxy-1-methylethyl)-s-triazine
(3) 2-trichloromethyl-4-(3-hydroxypropylamino)-6-(1-hydroxy-1-methylethyl)-s-triazine
(4) 2-trichloromethyl-4-(2-hydroxypropylamino)-6-(1-hydroxy-1-methylethyl)-s-triazine
(5) 2-trichloromethyl-4-(3-methoxypropylamino)-6-(1-hydroxy-1-methylethyl)-s-triazine
(6) 2-trichloromethyl-4-piperidino-6-(1-hydroxy-1-methylethyl)-s-triazine
(7) 2-trichloromethyl-4-(N-(2-hydroxyethyl)-N-methylamino)-6-(2-ethoxycarbonyloxyprop-2-yl)-s-triazine
(8) 2-trichloromethyl-4-ethylamino-6-(N,N-diethylcarbamoylmethylamino)-s-triazine
(9) 2-chloro-4-diethylamino-6-(2-methylsulfinylethylamino)-s-triazine
(10) 2-chloro-4-tert-butylamino-6-(2-methylsulfinylethylamino)-s-triazine
(11) 2-trichloromethyl-4-(3-methoxypropylamino)-6-(2-hydroxyethylamino)-s-triazine
(12) 2-trichloromethyl-4-(3-hydroxypropylamino)-6-piperidino-s-triazine
(13) 2-trichloromethyl-4-(2-hydroxypropylamino)-6-piperidino-s-triazine
(14) 2-trichloromethyl-4-piperidino-6-(2-(1-piperidino)ethyl)-s-triazine
(15) 2,4-bis-(trichloromethyl)-6-(diethanolamino-s-triazine

(16) 2,4-bis-(trichloromethyl)-6-(3-hydroxypropylamino)-s-triazine
(17) 2,4-bis-(trichloromethyl)-6-(2-chloroethylamino)-s-triazine
(18) 2,4-bis-(trichloromethyl)-6-(3-chloropropylamino)-s-triazine
(19) 2-trichloromethyl-4-piperidino-6-methoxy-s-triazine
(20) 2-trichloromethyl-4,6-bis-(2-chloroethylamino)-s-triazine
(21) 2-trichloromethyl-4-(2-hydroxypropylamino)-6-anilino-s-triazine
(22) 3-(4-chloro-6-ethylamino-s-triazin-2-ylimino) butyronitrile
(23) 3-(6-tert-butylamino-4-chloro-s-trazin-2-ylimino) butyronitrile Compositions according to the present invention also comprise a pharmaceutical carrier which may either be solid material or a liquid. Preparations for oral administration can be liquids or solids or any combination of these forms, such as syrups, elixirs, powders, capsules, or tablets. Preparations for administration of the active agent in unit dose form can be powders, compressed tablets, or a powder enclosed in a suitable capsule of absorbable material such as gelatin. The powders or compressed tablets may also comprise suitable excipients and/or diluents such as starch, lactose, stearic acid, magnesium stearate, dextrin or polyvinylpyrrolidone.

Preparations for topical application may be in the form of a liquid, a powder, a salve, or as an aerosol.

Preparations for parenteral administration may be sterile solutions or suspensions in liquids such as water, physiological saline, benzyl alcohol, ethyl oleate, methylcellulose, dimethyl sulfoxide or other liquid excipients known in the pharmaceutical and veterinary formulation art.

Any of the above preparations may contain the triazines of the invention or may contain in addition other pharmaceutically active agents. For example, for topical application it may be desirable to include a germicide and/or a fungicide.

The unit dosage or therapeutically effective quantity of the triazines used according to this invention as analgesics, muscle relaxants, anticonvulsants and/or tranquilizers can vary over wide limits. For oral or parenteral administration in some cases, as little as 0.01 milligram of the active material per kilogram of body weight can be effective in the reduction of pain or in effecting sedation and muscle relaxation, while seldom will a dosage in excess of about 500 milligrams per kilogram of body weight be required. In general, for oral administration, the effective dosage will be from 1.0 to 200 milligrams per kilogram of body weight, while for parenteral administration, the effective dosage will be from about 0.10 to about 100 milligrams per kilograms of body weight. Each dosage unit form—each capsule, tablet, ampoule, or prescribed dose—can contain from about 1 percent to about 95 percent active material, based upon the total weight of the formulation and preferably contains from about 2.5 percent to about 50 percent of the active material, on the same basis. Of course, it is possible to administer the therapeutics without the use of a pharmaceutical carrier.

The therapeutic agents used according to the invention can be administered either prior to or after the onset of the condition to be treated, such as when they are used as: analgesics for the amelioration of pain; motor depressants or tranquilizers to relieve nervous tension; central depressants to reduce hyperexcitability and induce sedation; or as muscle relaxants for relief from pain and discomfort of disorders involving muscle spasms.

PREPARATION

The s-triazines of this invention may be prepared by any of the conventional methods known in the art for preparing these types of s-triazines. The following descriptions are illustrative of some of the methods that may be used.

The starting material for most of the s-triazines disclosed herein is 2,4,6-tris-trichloromethyl-s-triazine while for some of the others a chloro-s-triazine is used. From these s-triazines the various compounds of the invention are prepared by replacement of the trichloromethyl or chloro groups with the various substituents depicted in Formula I.

Thus, the alkylamino, hydroxyalkylamino, methoxyalkylamino and piperidino substituents are readily introduced into the s-triazines of the invention by replacement of the chloro or trichloromethyl group on a chloro or trichloromethyl-s-triazine. This method involves heating the chloro or trichloromethyl-s-triazine in an organic solvent such as an ether or lower alkanol with a molar excess of the appropriate alkylamine, hydroxyalkylamine, methoxyalkylamine or piperidine. The hydroxyalkylamine-s-triazines are readily converted to chloroalkylamino-s-triazines by reaction with thionyl chloride in an organic solvent such as an ether or aromatic hydrocarbon at moderate temperatures.

The alkoxycarbonyloxyalkyl - s - triazines may be prepared by the methods described in U.S. 3,264,293. The s-triazines described therein are then used to prepare the s-triazines of this invention. The α-hydroxyalkyl-s-triazines ($-C(OH)R_2R_2$) may be prepared by reaction of the alkoxycarbonyloxyalkyl-s-triazine in a lower alkanol solvent at the reflux temperature with a barium alkanolate prepared by reacting barium hydroxide in hot alkanol, preferably methanol, and separating the carbonate from the barium alkanolate.

The dialkylaminocarbonylalkylamino - s - triazines may be prepared by converting a corboxyalkylamino-s-triazine to the acid chloride using thionyl chloride as the acylating agent. The resulting acid halide is then reacted in a halogenated hydrocarbon diluent with a molar excess of a dialkylamine to form the dialkylaminocarbonylalkylaminos-triazine. The carboxyalkylamino - s - triazine is prepared by heating an appropriate aminoalkanoic acid with a trichloromethyl-s-triazine in a lower alkanol solvent in the presence of sodium.

The alkylsulfinylalkylamino - s - triazines are prepared by reaction of a chloro-s-triazine with an appropriate alkylsulfinylalkylamine in an organic solvent, preferably a ketone.

The piperidinoalkyl - s - triazines are readily prepared by reacting an alkenyl-s-triazine with piperidine.

The anilino-s-triazines are prepared by heating a trichloromethyl - s - triazine with a solution of sodium in a lower alkanol.

The anilino-s-triazines are prepared by heating a trichloromethyl-s-triazine with aniline and sodium hydroxide.

The last group of s-triazines, those containing a

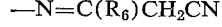

substituent, are prepared by heating a chloro-s-triazine with an appropriate iminoacylonitrile

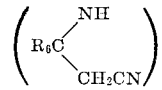

in an ether solvent.

The following examples illustrate some of the methods for preparing the s-triazines of the invention.

Example I 85 g. of 2-trichloromethyl-4-ethylamino-6-(1-methyl-1-(ethoxycarbonyl) ethyl)-s-triazine was dissolved and heated in 300 ml. methanol. 72 g. Ba(OH)$_2$ was dissolved in 400 ml. of heated methanol and the BaCO$_3$ filtered off. This solution was then gradually added to the boiling solution of s-triazine over a period of 3 hours.

The reaction mixture was concentrated and the residue added, while stirring, to dilute HCl, liberating CO$_2$. The water-insoluble part was dissolved in methylene chloride and after washing, the solution was concentrated to a neutral reaction. The residue is triturated with water, yielding the crystalline 2-trichloromethyl - 4 - ethylamino-6-(1-methyl - 1 - hydroxyethyl)-s-triazine, M.P. 80–82° C.

Example II (a) A solution of 33.6 g. (0.4 mol) iminobutyronitrile in 350 ml. dioxane was added at room temperature to a solution of 36.8 g. (0.2 mol) of cyanuric chloride in 200 ml. of dioxane. The temperature increased to 45–50° C. whereby the iminodiacetonitrile salt precipitated. The mixture was filtered and the precipitate washed with hexane. After concentrating the dioxanehexane filtrate, 35.8 g. of 2,6-dichloro-4-($\beta$-butyronitrilimino) - s - triazine, M.P. 158–63° C., crystallized out.

(b) To a solution of 23.0 g. (0.1 mol) of the product of II(a) in 200 ml. dioxane was slowly added a solution of 9.0 g. (0.2 mol) of ethylamine in 100 ml. dioxane. The precipitate was filtered and washed with water and after drying, yielded 3-(4-chloro - 6 - ethylamino-s-triazin-2-ylimino)butyronitrile, M.P. 167–72° C.

The compound 3-(6-tert-butylamino - 4 - chloro-s-triazin-2-ylimino)-butyronitrile, M.P. 115–25° C. was similarly prepared using tert-butylamine.

Example III

To a solution of 43.3 g. (0.1 mol) of 2,4,6-tris-trichloromethyl-s-triazine in 400 ml. methanol was added 25.5 g. (0.3 mol) of piperidine. After warming, a solution of 1 g. of sodium in 20 ml. methanol was added and the mixture was refluxed for 4 hours. After cooling the product 2 - trichloromethyl - 4-piperidino-6-methoxy-s-triazine, M.P. 118–120° C., precipitated out.

Example IV (a) 10 g. (0.11 mol) of 3-methoxypropylamine was added to a solution of 43.5 g. (0.1 mol) of 2,4,6-tris-trichloromethyl-s-triazine. After a short time, 2,6-bis-trichloromethyl-4-(3-methoxypropylamino)-s-triazine, M.P. 112–115° C., crystallized out.

(b) 40.3 g. (0.1 mol) of the IV(a) product in 250 ml. methanol was refluxed for 12 hours with 18.3 g. (0.3 mol) ethanolamine and then concentrated. After the residue was triturated with a acetone-water solution (1:1), the product 2 - trichloromethyl-4-(3-methoxypropylamino)-6-(2-hydroxyethylamine)-s-triazine, M.P. 94–96° C., crystallized out.

Example V 34.2 g. (0.1 mol) of 2,6-bis-trichloromethyl-4-vinyl-s-triazine was added to 42.5 g. (0.5 mol) of piperidine and heated to 60° C. After standing overnight, the solution was added to 500 ml. water; the product, 2-trichloromethyl-4-piperidino-6-(2-(1-piperidino)ethyl)-s-triazine, M.P. 74–76° C., slowly crystallized out.

PREFERRED EMBODIMENTS

While the s-triazines of Formula I show some depressant effects in mammals, there are differences both quantitative and qualitative exhibited by individual members of the class. Especially preferred depressants because of their activity as analgesics, muscle relaxants, anticonvulsants, and/or tranquilizers are the s-triazine of Formula I wherein Y is —NHR$_1$ where R is alkyl of 1–4 carbon atoms, preferably ethyl or tert-butyl and Z is

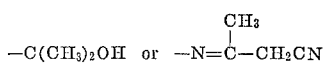

Preferred s-triazines within this subclass are:

2-trichloromethyl-4-ethylamino-6-(1-hydroxy-1-methylethyl)-s-triazine 3-(4-chloro-6-ethylamino-s-triazin-2-ylimino) butyronitrile 3-(6-tert-butylamino-4-chloro-s-triazin-2-ylimino) butyronitrile The following examples are presented to illustrate certain pharmacological responses induced by triazine compositions of the invention. These examples should in no way be regarded as limiting the scope of the invention.

The results of the various pharmacological responses tested are shown in Table I.

TABLE I

| | Approximate analgesic dose, oral(a), mg./kg. | Approximate muscle relaxant dose, oral(b), mg./kg. | Analgesic response intraperitoneal(c) analgesic rating at 100 mg./kg. | Muscle relaxant, tranquilization response(d) | | Anticonvulsant response(e) | |
|---|---|---|---|---|---|---|---|
| | | | | Muscle relaxant rating at 100 mg./ kg. i.p. | Pernicious preening antagonism based on ED$_{50}$ i.p. or 32 mg./ kg. i.p. | Maximal electro-shock seizure antagonism based on ED$_{50}$ i.p. or 100 mg./ kg. i.p. | Anti-strychnine response ratio based on ED$_{50}$ i.p. or 180 mg./kg. i.p. |
| Test compound [1]: | | | | | | | |
| 1 | | 250 | ++ | ++ | + | ++ | + |
| 2 | 500 | 500 | ++ | 0 | + | + | 0 |
| 3 | 250 | 500 | ++ | 0 | + | 0 | 0 |
| 4 | 125 | 250 | ++ | 0 | + | ++ | 0 |
| 5 | 500 | | + | 0 | + | 0 | + |
| 6 | 250 | | 0 | 0 | | | |
| 7 | | | ++ | 0 | 0 | 0 | 0 |
| 8 | | 500 | 0 | 0 | | | |
| 9 | | 250 | + | 0 | 0 | 0 | 0 |
| 10 | | | 0 | + | + | 0 | |
| 11 | 500 | 500 | ++ | 0 | + | 0 | 0 |
| 12 | | | 0 | ++ | + | + | + |
| 13 | 500 | | 0 | ++ | ++ | 0 | 0 |
| 14 | 500 | 500 | + | ++ | +++ | + | 0 |
| 15 | | 500 | | | | | |
| 16 | | 500 | + | 0 | + | + | |
| 17 | | 500 | | | | | |
| 18 | | 500 | 0 | 0 | | | |
| 19 | 500 | | | | | | |
| 20 | | | + | + | | | |
| 21 | 250 | 250 | ++ | + | + | ++ | + |
| 22 | 250 | 250 | ++ | + | + | 0 | 0 |
| 23 | 250 | 250 | ++ | ++ | ++ | 0 | 0 |

[1] Numbers correspond to numbered triazines in cols. 2 and 3.

(a) Analgesic response.—The process of an analgesic effect was identified as an absence of a struggling or phonating response to a manual pinch of the tail of treated mice. The laboratory white mice for each treatment were placed in individual compartments. The mice were orally intubated with the test compound at the dosage of 500 milligrams per kilogram, and 15 minutes, 1 hour, 2 hours, 4 hours and 24 hours after treatment a pinch of the tail was applied to each mouse. Any compound inducing an analgesic response in 50 percent of the mice at any of these test intervals was considered active in this test. Some of the compounds were tested at lower dosages.

While the exact safety factor has not been evaluated for all compounds of the invention, it has been found that the effective analgesic dose of the triazines of the invention is considerably lower than the toxic dose ($LD_{50}$).

(b) Muscle relaxant response.—As in (a) above, mice were orally intubated with the test compound and the muscle relaxant effects of the compounds were evaluated. The procedure for assessing skeletal muscle relaxant activity involves an evaluation of passivity, flaccidity and pinnal reflex blockage. Passivity is defined as an absence of the struggle behavior of the animal when manipulated manually and may indicate skeletal muscle relaxation, central depression, tranquilization, paralysis, or anesthesia. Flaccidity is measured by the decreased tonus of skeletal musculature and may indicate myorelaxant activity, central depression, or paralysis. The pinnal reflex is tested by touching the inner aspects of the ear with a fine wire to elicit a characteristic ear twitch. An impairment of this reflex suggests an inhibition of polysynaptic reflexes.

(c) Analgesic responce—intraperitoneal.—The analgesic response was determined in laboratory white mice by injection of the triazines under test at an intraperitoneal dosage of 100 mg. per kg. The results were obtained by evaluation similar to that described for the Approximate Analgesic Dose—Oral. The compounds were rated on a one plus (+) to four plus (++++) scale. When 1–2 mice out of ten showed an analgesic response, a + rating was assigned; ++ indicated that 3–6 out of ten mice responded; +++ indicated that 7–9 out of ten responded; while a ++++ rating meant that all ten mice gave an analgesic response at the dosage tested.

(d) Muscle relaxant—tranquilization response.—The muscle relaxant effects, as expressed by passivity, flaccidity and pinnal reflex blockage, were assessed in laboratory mice injected intraperitoneally with 100 mg./kg. of the test compound as in (b). In addition the tranquilizing effects of the compounds under test were evaluated by the pernicious preening test (Wilfon, J. G. et al. Fed. Proc. 19:20, 1960). The pernicious preening behavior was elicited by painting the rear of the mice with a pilocohesive dye. A violent unremitting tearing of the stiff, cohering strands of hair constitutes the pernicious preening behavior. Thirty minutes after injection, the pilocohesive dye was applied and the presence or absence of the compulsive behavior was noted for a 10 minute interval. The ratings for the muscle relaxant response are based upon the scale given in (c). Effective antagonism of pernicious preening is shown with the same scale as in (c). That is, +=1–2 mice out of ten, ++=3–6 mice out of ten, +++=7–9 mice out of ten and ++++=10 mice out of ten responded. Some of these values for the individual triazines were determined at a dosage of 32 mg./kg. while the others were determined on the basis of $ED_{50}$ values, the dose at which 50 percent of the treated animals exhibit an effective response. These $ED_{50}$ values were then translated into the +1 to +4 scale by the following criteria: $ED_{50}$ values of 30–100 mg./kg.=+, 10–30 mg./kg.=++, 3–10 mg./kg.=+++ and <3 mg./kg.=++++.

(e) Anticonvulsant response.—The test procedures used were maximal electroshock and antistrychnine assay methods. The test compound was intraperitoneally injected into laboratory mice and after 30 minutes the anticonvulsant activity was measured. The technique employed in the maximal electroshock method was essentially that of Swinyard, E. A., J. Amer. Pharm. Assoc. 38:201 (1949). The mice were subjected to an alternating current stimulus, about equal to three times the current necessary to produce maximal seizures, and prevention of hindlimb tonic extensor phase was considered to be an effective anticonvulsant action. In the antistrychnine assay, the mice were intraperitoneally injected with the test compound and then were challenged with a lethal intraperitoneal dose of strychnine sulfate. Increase in survival time against the lethal action of strychnine of greater than three standard deviations of the control mean was considered an effective action. Anticonvulsant activity in these tests suggests skeletal muscle relaxation or efficacy against epileptic seizures. Effective antagonism of maximal electroshock seizure and antistrychnine activity are given on the same +1 to +4 scale as in (c). Some of these values for the individual triazines in the maximal electroshock seizure test were determined at a dosage of 100 mg./kg. while the others were determined on the basis of $ED_{50}$ values, the dose at which 50 percent of the treated animals exhibited an effective response. These $ED_{50}$ values were then translated into the +1 to +4 scale by the following criteria: $ED_{50}$ values of 100–300 mg./kg.=+, 30–100 mg./kg.=++, 10–30 mg./kg.=+++ and <10 mg./kg.=++++

The antistrychnine activities for the individual triazines were also determined in either of two ways. Some are based on the response ratio at 180 mg./kg. while the others on the $ED_{50}$ values. The criteria for translating the $ED_{50}$ values to the +1 to +4 scale is the same as for the maximal electroshock seizure test.

We claim as our invention:
1. A depressant veterinary and pharmaceutical composition comprising a
(a) compound of the formula

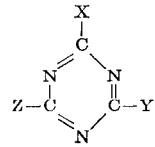

wherein
X is —Cl or —CCl$_3$;
Y is —NRR$_1$ in which
R is hydrogen, alkyl of 1–3 carbon atoms or hydroxyalkyl of 1–4 carbon atoms,
R$_1$ is alkyl of 1–4 carbon atoms, hydroxyalkyl of 1–4 carbon atoms, chloroalkyl of 1–3 carbon atoms or methoxyalkyl of 2–5 carbon atoms and
R and R$_1$ together with the nitrogen may represent piperidino; and
Z is

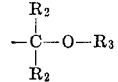

in which
R$_2$ is alkyl of 1–3 carbon atoms and
R$_3$ is hydrogen or alkoxycarbonyl of up to 4 carbon atoms;

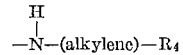

in which R$_4$ is dialkylaminocarbonyl of up to 7 carbon atoms or alkylsulfinyl of 1–3 carbon atoms and alkylene is of 1–3 carbon atoms;

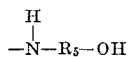

in which
R$_5$ is alkylene of 1–4 carbon atoms;

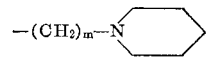

in which $m$ is 2–4;
—CCl$_3$;
—O-alkyl in which alkyl is of 1–3 carbon atoms;

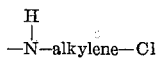

in which alkylene is of 1–3 carbon atoms;

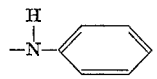

or

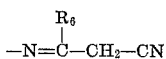

in which $R_6$ is alkyl of 1–3 carbon atoms and
(b) a physiologically acceptable carrier, the percent by weight of (a) in the total formulation being from about one to about 95.

2. The veterinary and pharmaceutical composition of claim 1 wherein R is hydrogen and $R_1$ is alkyl of 1–4 carbon atoms and Z is

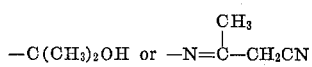

3. The veterinary and pharmaceutical composition of claim 2 wherein X is trichloromethyl, $R_1$ is ethyl and Z is —$C(CH_3)_2OH$.

4. The veterinary and pharmaceutical composition of claim 2 wherein X is chlorine, $R_1$ is ethyl and Z is

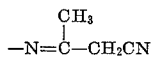

5. The veterinary and pharmaceutical composition of claim 2 wherein X is chlorine, $R_1$ is tert-butyl and Z is

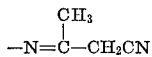

6. A method of inducing a depressant response in mammals comprising administering to said mammals in need thereof an effective dosage of a compound of the formula

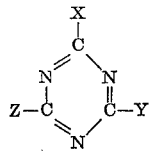

wherein
X is —Cl or —$CCl_3$;
Y is —$NRR_1$ in which
R is hydrogen, alkyl of 1–3 carbon atoms or hydroxyalkyl of 1–4 carbon atoms,
$R_1$ is alkyl of 1–4 carbon atoms, hydroxyalkyl of 1–4 carbon atoms, chloroalkyl of 1–3 carbon atoms or methoxyalkyl of 2–5 carbon atoms and
R and $R_1$ together with the nitrogen may represent piperidino; and
Z is

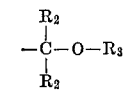

in which
$R_2$ is alkyl of 1–3 carbon atoms and
$R_3$ is hydrogen or alkoxycarbonyl of up to 4 carbon atoms;

in which
$R_4$ is dialkylaminocarbonyl of up to 7 carbon atoms or alkylsulfinyl of 1–3 carbon atoms and alkylene is of 1–3 carbon atoms;

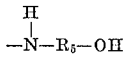

in which $R_5$ is alkylene of 1–4 carbon atoms;

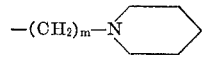

in which $m$ is 2–4;
—$CCl_3$;
—O is allyl in which alkyl is of 1–3 carbon atoms;

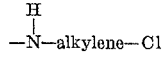

in which alkylene is of 1–3 carbon atoms;

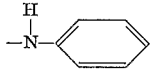

or

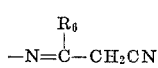

in which $R_6$ is alkyl of 1–3 carbon atoms.

7. The method of claim 6 wherein said compound is administered orally to said mammal.

8. The method of claim 6 wherein said compound is administered parenterally to said mammal.

9. The method of claim 6 wherein R is hydrogen and $R_1$ is alkyl of 1–4 carbon atoms and Z is

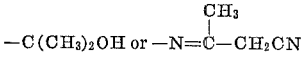

10. The method of claim 9 wherein X is trichloromethyl, $R_1$ is ethyl and Z is —$C(CH_3)_2OH$.

11. The method of claim 9 wherein X is chlorine, $R_1$ is ethyl and Z is

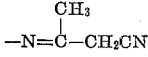

12. The method of claim 9 wherein X is chlorine, $R_1$ is tert-butyl and Z is

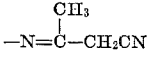

References Cited

UNITED STATES PATENTS

| | | | |
|---|---|---|---|
| 2,867,621 | 1/1959 | Grundmann | 260—249.5 |
| 2,909,420 | 10/1959 | Gysin et al. | 260—249.5 |
| 3,086,855 | 4/1963 | Knusli et al. | 260—249.9 |

FOREIGN PATENTS

| | | | |
|---|---|---|---|
| 222,552 | 7/1959 | Australia | 260—249.8 |
| 631,493 | 11/1961 | Canada | 260—249.9 |
| 1,329,306 | 4/1963 | France | 260—249.5 |

ALBERT T. MEYERS, Primary Examiner

DAREN M. STEPHENS, Assistant Examiner